W. O. SNELLING.
PROCESS AND APPARATUS FOR MAKING CARBON BLACK.
APPLICATION FILED OCT. 14, 1915.
1,213,915.  Patented Jan. 30, 1917.
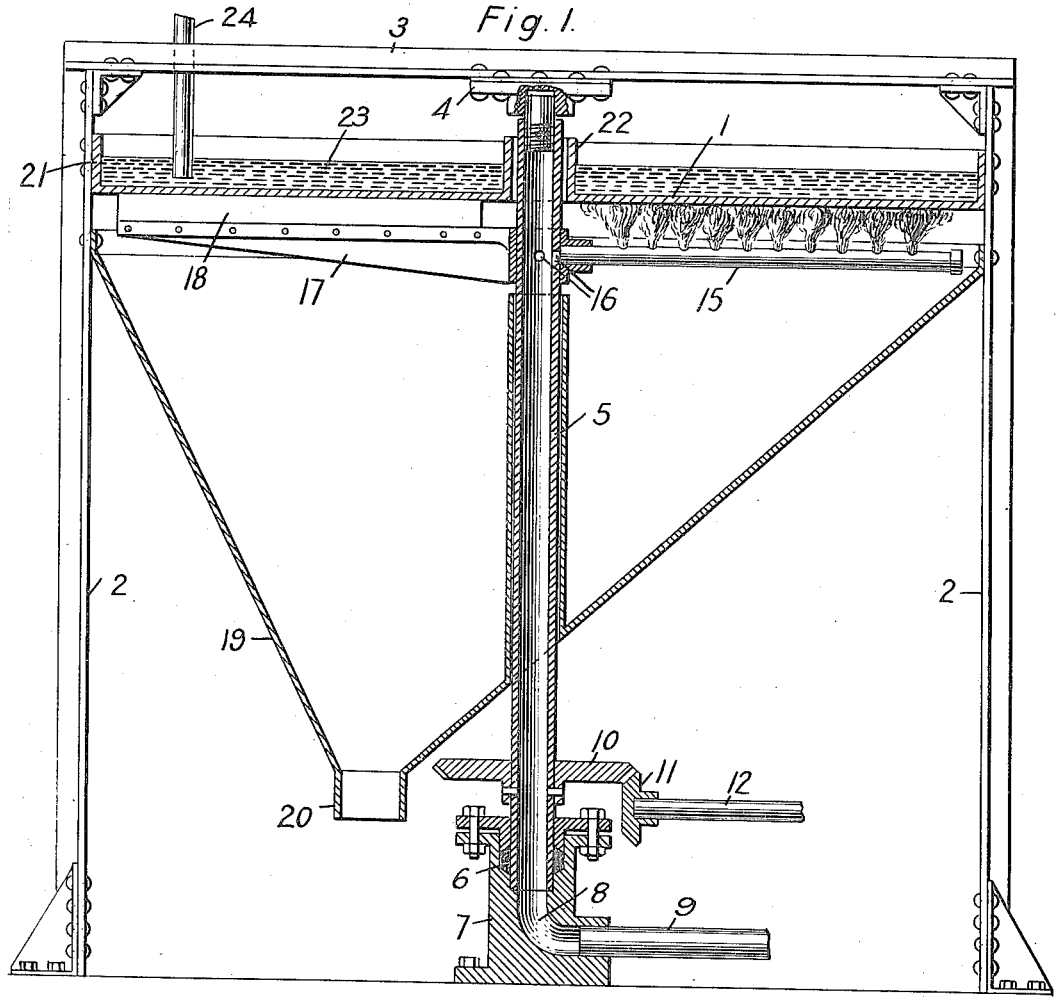
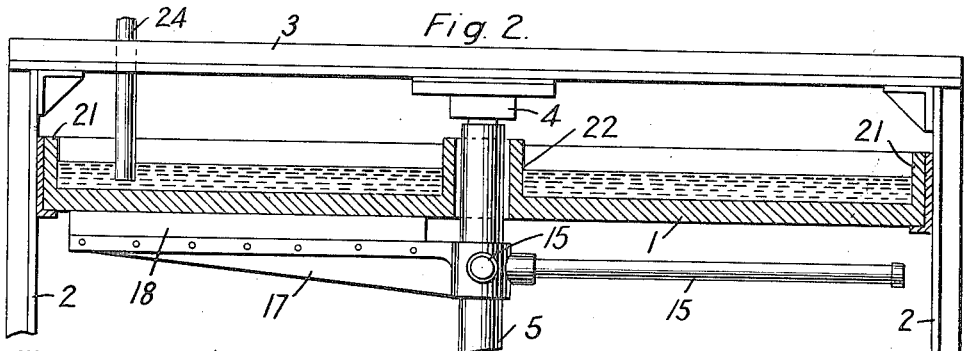

UNITED STATES PATENT OFFICE.

WALTER O. SNELLING, OF PITTSBURGH, PENNSYLVANIA.

PROCESS AND APPARATUS FOR MAKING CARBON-BLACK.

1,213,915. Specification of Letters Patent. Patented Jan. 30, 1917.

Application filed October 14, 1915. Serial No. 55,754.

*To all whom it may concern:*

Be it known that I, WALTER O. SNELLING, a citizen of the United States, and a resident of Pittsburgh, in the county of Allegheny and State of Pennsylvania, have invented a new and useful Improvement in Processes and Apparatus for Making Carbon-Black, of which the following is a specification.

My invention relates to the manufacture of carbon black or lampblack, and has for its object to provide an improved process and apparatus for preparing this substance.

More particularly, my invention aims to provide a novel and effective method of cooling the surfaces upon which the carbon is deposited.

Carbon black is usually made by projecting hydrocarbon flames, containing an excess of unburned carbon, upon smooth receiving surfaces from which the deposited carbon is removed by means of suitable scrapers. The hydrocarbons are decomposed by the heat of the flame, and the liberated carbon becomes incandescent and finally burns, unless it is brought into contact with relatively cool surfaces. Therefore, in order to obtain a large yield of carbon, it is desirable that the receiving surfaces be cooled, so that the temperature of the flame may be quickly reduced below the combustion point. The maximum amount of carbon is deposited when the flame is brought into contact with cold collecting surfaces as quickly as possible after the hydrocarbons are decomposed. However, since water vapor is one of the combustion products present in the flame, the receiving surfaces must not be cooled sufficiently to condense water with the carbon.

According to my present invention, I make use of carbon-collecting surfaces which are cooled to the most efficient temperature, that is to say, slightly above 100° C., and I employ water as the cooling agent. I maintain such surfaces at a constant and predetermined temperature, preferably just above 100° C., by either dissolving suitable materials in the cooling water, and thereby raising its boiling point; by utilizing superheated steam as the cooling medium, or by making the receiving plates sufficiently thick to retard the transfer of heat through them to the water and to maintain a difference of several degrees between the temperatures on the carbon-receiving surface and on the surface in contact with the water.

The details of my invention will be discussed in connection with the accompanying drawing, in which—

Figure 1 is a side view, partly in vertical section and partly in elevation, of a carbon black apparatus embodying my invention, and Fig. 2 is a fragmentary view, similar to Fig. 1, showing part of a device equipped with a modified form of carbon-receiving plate.

The apparatus shown in Fig. 1 of the drawing comprises a stationary plate 1, supported upon a suitable frame consisting of vertical standards 2, united by horizontal beams 3, to which is attached an upper bearing member 4 for a vertical tubular shaft 5. The lower end of the shaft 5 is rotatably supported in a bearing 6 carried by a block 7, which is provided with an interior passage 8 communicating with the interior of the tubular shaft 5 and with a pipe 9, through which carbonaceous gas may be admitted to the apparatus. The shaft 5, near its lower end, carries a bevel gear wheel 10, meshing with a bevel pinion 11 secured to a shaft 12, which is driven from any suitable source of power (not shown).

Secured to the tubular shaft 5, adjacent to the plate 1, is a burner consisting of one or more radially-extending perforated pipes 15, each of which is closed at its outer end and communicates with the interior of the shaft 5 through a port 16. An arm 17 also extends from the shaft 5, and carries a scraper 18, which, as the shaft 5 rotates, serves to remove the carbon black deposited by the flames from the burner 15. The carbon black falls into a hopper 19, which is secured to the standards 2 and which terminates in a spout 20 for delivering the powder into any suitable receptacle.

The plate 1 is provided with upturned edges, as shown at 21, and with a central collar 22 surrounding the shaft 5, and thus forms a shallow pan for containing a supply of cooling liquid 23. This liquid is preferably a solution consisting of a suitable salt dissolved in water, the amount of the dissolved salt being so proportioned that the boiling point of the solution is between 102° C. and 105° C. For example, a saturated solution of sodium chlorid, boiling at 102° C., may be employed, or preferably, a solution of calcium chlorid, a 6% solution of which boils at 101° C. A 20% solution boils at 105° C., while stronger solutions boil at correspondingly higher temperatures. The liquid is maintained at a constant level, by water introduced through a pipe 24 to compensate for loss by evaporation, and the strength of the solution therefore remains constant.

The structure shown in Fig. 2 is similar in most of its details to the apparatus shown in Fig. 1, and the corresponding parts are designated by like numerals. In this modification, however, the plate 1 is made much thicker than the receiving plate in Fig. 1, its thickness depending upon the rate of heat conductivity of the metal composing it and upon the difference which it is desired to maintain between the upper and lower surfaces of the plate. In this form of device, water only is required as the cooling agent. The gas burners supply enough heat to maintain the water at the boiling point, and although the temperature of the water cannot be raised above this point, the lower surface of the plate will be several degrees higher in temperature, or in just the proper condition for the most efficient recovery of carbon, without condensation of moisture and consequent deterioration of the carbon. The supply of water is constantly renewed and maintained at a constant level, as in the device shown in Fig. 1.

The mechanical details herein shown and described form no essential part of my invention, which broadly contemplates cooling carbon-receiving surfaces by means of an aqueous fluid, without lowering their effective temperature below 100° C. It is therefore to be understood that my invention is not restricted to any special structural details or process steps, but that it is limited only by the scope of the appended claims.

I claim as my invention:

1. Apparatus for making carbon black comprising means for projecting a carbonaceous flame upon a carbon-collecting surface, and means for maintaining the said surface at a temperature slightly above 100 degrees centigrade.

2. Apparatus for making carbon black comprising means for projecting a carbonaceous flame upon a carbon-collecting surface, and means for maintaining the said surface at a temperature above 100 degrees centigrade but below the temperature of the flame.

3. Apparatus for making carbon black comprising means for projecting a carbonaceous flame upon a carbon-collecting member, and means for applying a cooling fluid to the said member, the said member being sufficiently thick to maintain a substantial difference between the temperatures of its carbon-collecting and fluid-engaging surfaces.

4. Apparatus for making carbon black comprising means for projecting a carbonaceous flame upon a horizontal carbon-collecting plate having upturned edges forming a receptacle for containing a cooling fluid, the said plate being sufficiently thick to maintain a substantial difference between the temperatures of its carbon-collecting and fluid-engaging surfaces.

5. The process of making amorphous soots that comprises projecting a luminous flame upon a surface maintained at a temperature slightly above 100 degrees centigrade.

6. The process of making amorphous soots that comprises projecting a luminous flame upon a fluid-cooled surface maintained above 100 degrees centigrade.

7. The process of making carbon black that comprises projecting a carbonaceous flame upon a carbon-collecting member and applying to the said member a cooling fluid having a boiling point above 100 degrees centigrade.

8. The process of making carbon black that comprises projecting a carbonaceous flame upon a carbon-collecting member and applying to the said member an aqueous cooling fluid capable of maintaining the temperature of the said member at a temperature above 100 degrees centigrade.

9. The process of making carbon black that comprises projecting a carbonaceous flame upon a carbon-collecting member, and applying to the said member an aqueous cooling solution having a boiling point above 100 degrees centigrade.

10. The process of making carbon black that comprises projecting a carbonaceous flame upon a carbon-collecting member, and applying to the said member an aqueous cooling solution containing about 10 per cent. of calcium chlorid.

11. The process of making carbon black that comprises projecting a carbonaceous flame upon a carbon-collecting member, applying to the said member an aqueous cooling solution having a boiling point above 100 degrees centigrade, and adding water to the said solution to compensate for evaporation of the said solution.

12. The process of making carbon black that comprises projecting a carbonaceous flame upon a carbon-collecting member, applying to the said member an aqueous cooling solution containing about 10 per cent. of calcium chlorid, and maintaining the concentration of the said solution by adding water thereto.

In testimony whereof, I have hereunto subscribed my name this 6th day of October 1915.

WALTER O. SNELLING.

Witnesses:
M. R. McKeown,
J. G. Kaiser.